(12) United States Patent
Kim et al.

(10) Patent No.: US 12,126,474 B2
(45) Date of Patent: Oct. 22, 2024

(54) RECEIVER FOR DATA SIGNAL BASED ON PULSE AMPLITUDE MODULATION AND INTERFACE THEREFOR

(71) Applicant: SAMSUNG ELECTRONICS CO., LTD., Suwon-si (KR)

(72) Inventors: Jaekwon Kim, Gangwon-do (KR); Junghoon Chun, Suwon-si (KR)

(73) Assignees: SAMSUNG ELECTRONICS CO., LTD.; RESEARCH & BUSINESS FOUNDATION SUNGKYUN

( * ) Notice: Subject to any disclaimer, the term of this patent is extended or adjusted under 35 U.S.C. 154(b) by 6 days.

(21) Appl. No.: 18/094,852

(22) Filed: Jan. 9, 2023

(65) Prior Publication Data

US 2023/0164009 A1    May 25, 2023

Related U.S. Application Data

(63) Continuation of application No. 17/376,637, filed on Jul. 15, 2021, now Pat. No. 11,552,833.

(30) Foreign Application Priority Data

Oct. 16, 2020 (KR) .......................... 10-2020-0134609

(51) Int. Cl.
  *H04L 25/03* (2006.01)
  *H04L 25/49* (2006.01)
  *H04L 27/06* (2006.01)

(52) U.S. Cl.
  CPC .... *H04L 25/4917* (2013.01); *H04L 25/03057* (2013.01); *H04L 27/06* (2013.01)

(58) Field of Classification Search
  CPC ................... H04L 25/4917; H04L 25/03057; H04L 27/06
  See application file for complete search history.

(56) References Cited

U.S. PATENT DOCUMENTS

| | | | |
|---|---|---|---|
| 8,576,903 B2 | 11/2013 | Raphaeli et al. | |
| 9,225,561 B2 | 12/2015 | Kizer et al. | |
| 9,590,799 B2 | 3/2017 | Lyubomirsky et al. | |
| 9,614,659 B2 | 4/2017 | Hoshyar et al. | |
| 9,722,828 B2 | 8/2017 | Sun et al. | |
| 9,859,907 B1 * | 1/2018 | Li | ........................ H03M 1/0678 |

(Continued)

FOREIGN PATENT DOCUMENTS

| | | |
|---|---|---|
| KR | 10-1847502 B1 | 4/2018 |
| KR | 10-2019-0121852 A | 10/2019 |
| KR | 1020190133035 A | 11/2019 |

OTHER PUBLICATIONS

Office Action dated Aug. 22, 2024 for corresponding KR Patent Application No. 10-2020-0134609.

*Primary Examiner* — Janice N Tieu
(74) *Attorney, Agent, or Firm* — Muir Patent Law, PLLC

(57) ABSTRACT

A receiver includes an interface configured to receive a data signal based on an n-level pulse amplitude modulation (PAM-n) in which n is an integer equal to or greater than 4. The interface may include an analog-digital converting circuit configured to adjust a reference voltage, for distinguishing second bit data from the data signal in a second section, based on first bit data converted from the data signal in a first section and the first bit data converted from the data signal in the second section, the second section being after the first section.

20 Claims, 16 Drawing Sheets

(56) References Cited

U.S. PATENT DOCUMENTS

| | | | |
|---|---|---|---|
| 9,906,232 B1 | 2/2018 | Cho et al. | |
| 10,516,427 B2 | 12/2019 | Hossain et al. | |
| 11,394,589 B1 | 7/2022 | Mayer et al. | |
| 2016/0126970 A1* | 5/2016 | Xu | H03M 1/1061 |
| | | | 341/120 |
| 2016/0277219 A1 | 9/2016 | Venkatram et al. | |
| 2018/0167078 A1* | 6/2018 | Ding | H03M 1/468 |
| 2021/0313937 A1 | 10/2021 | Kim et al. | |
| 2023/0085935 A1* | 3/2023 | Kong | H02P 21/18 |

* cited by examiner 1-level Transition 2-level Transition 3-level Transition

RECEIVER FOR DATA SIGNAL BASED ON PULSE AMPLITUDE MODULATION AND INTERFACE THEREFOR

CROSS-REFERENCE TO RELATED APPLICATIONS

This is a continuation application based on pending application Ser. No. 17/376,637, filed Jul. 15, 2021, the entire contents of which is hereby incorporated by reference.

Korean Patent Application No. 10-2020-0134609, filed on Oct. 16, 2020, in the Korean Intellectual Property Office, and entitled: "Receiver for Data Signal Based On Pulse Amplitude Modulation and Electronic Device Including the Same," is incorporated by reference herein in its entirety.

BACKGROUND

1. Field

Embodiments relate to a receiver, and more particularly, to a receiver configured to receive a data signal based on pulse amplitude modulation and an electronic device including the receiver.

2. Description of the Related Art

Due to rapid supply of mobile devices and a sharp increase in Internet access, demand for data transmission with a high capacity and a high speed is increasing day by day. However, the demand for data transmission with a high capacity and a high speed is not easily satisfied in a signal modulation method based on the Non-Return to Zero (NRZ) type encoding. Recently, a pulse amplitude modulation (PAM) method has been actively studied as an alternative to a signal method of data transmission with high capacity and high speed.

SUMMARY

Embodiments are directed to a receiver, including: an interface configured to receive a data signal based on an n-level pulse amplitude modulation (PAM-n) in which n is an integer equal to or greater than 4. The interface may include an analog-digital converting circuit configured to adjust a reference voltage, for distinguishing second bit data from the data signal in a second section, based on first bit data converted from the data signal in a first section and the first bit data converted from the data signal in the second section, the second section being after the first section.

Embodiments are also directed to a receiver, including: an interface configured to receive a data signal based on 4-level pulse amplitude modulation (PAM-4). The interface may include: a first analog-digital converter (ADC) configured to convert the data signal in a first section into first most significant bit (MSB) data and first least significant bit (LSB) data; and a second ADC configured to convert the data signal in a second section, after the first section, into second MSB data and second LSB data. The second ADC may be configured to adjust a first reference voltage, for distinguishing the second LSB data, based on the first MSB data and the second MSB data.

Embodiments are also directed to an electronic system, including: a transmitter; and a receiver. The transmitter and the receiver may be configured to mutually transmit and receive a data signal based on n-level pulse amplitude modulation (PAM-n) in which n is an integer equal to or greater than 4. The receiver may include: a first analog-digital converter (ADC) configured to convert the data signal in an odd-number section into first k-bit data, in which k is an integer equal to or greater than 2; and a second ADC configured to convert the data signal in a subsequent even-number section into second k-bit data. The first ADC and the second ADC may be configured to mutually provide high-order bit data of the first k-bit data and the second k-bit data for adjusting a reference voltage, the reference voltage being used for conversion of the data signal.

BRIEF DESCRIPTION OF THE DRAWINGS

Features will become apparent to those of skill in the art by describing in detail example embodiments with reference to the attached drawings in which.

DETAILED DESCRIPTION

Figure 1:
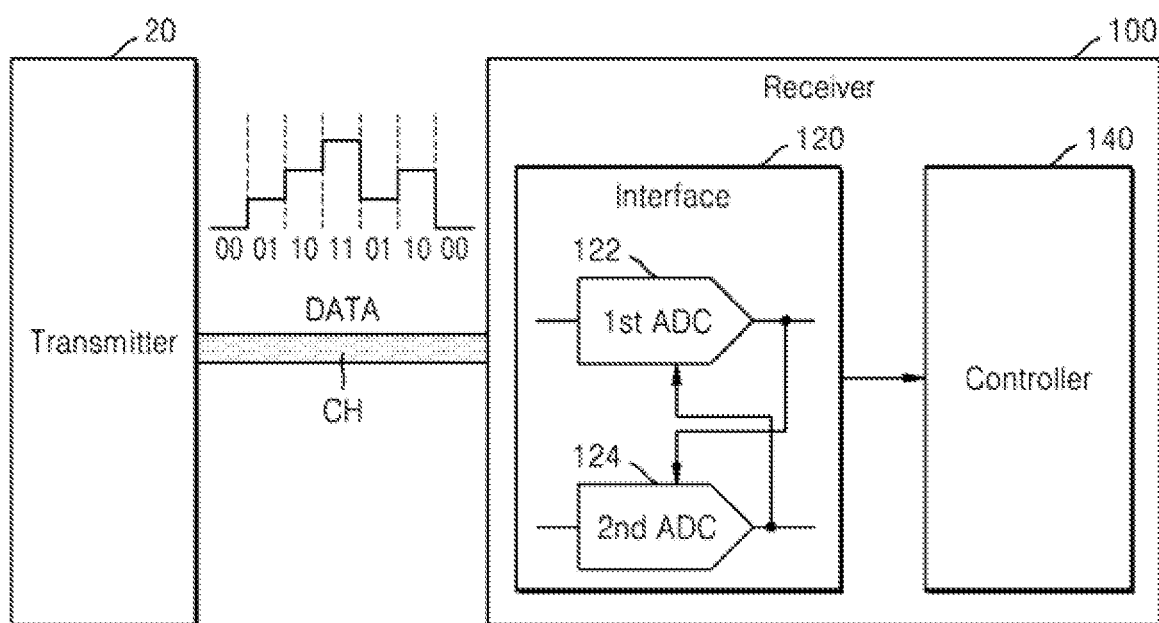
FIG. 1 is a schematic block diagram showing an electronic device according to an example embodiment.

FIG. 1 is a block diagram of an electronic device 10 according to an example embodiment.

The electronic device 10 may be implemented as, for example, a communication device that performs communication with other devices. For example, the electronic device 10 may be used in a wireless communication device, a cellular phone, a personal digital assistant, a handheld device, a wireless modem, a wireless phone, a wireless station, a Bluetooth device, a health care device, a wearable device, and the like. In addition, as another example, the electronic device 10 may be implemented as a semiconductor device to program data or read data in response to a request of a host.

Referring to FIG. 1, the electronic device 10 may include a transmitter 20 and a receiver 100. Hereinafter, for convenience of description, the transmitter 20 and the receiver 100 are described according to an aspect of transmitting and receiving a data signal DATA, but functions of the transmitter 20 and the receiver 100 are not limited thereto, and the transmitter 20 and the receiver 100 may perform various operations including data processing with respect to the data signal DATA.

The transmitter 20 may transmit the data signal DATA to the receiver 100 through a channel CH. The data signal DATA may include n-bit number of symbols according to n-level pulse amplitude modulation (hereinafter, referred to as PAMn) and may be shown as $2^n$ data values. For example, as shown in FIG. 1, the transmitter 20 may generate and output a data signal DATA that may include two-bit number of symbols according to PAM4 and represent four data values (00, 01, 10, and 11). The data signal DATA in FIG. 1 may be a single signal and may be transmitted/received through a single channel CH between the transmitter 20 and the receiver 100. Furthermore, the data signal DATA may be a differential signal and may be transmitted/received through differential channels between the transmitter 20 and the receiver 100. The implementation example of the receiver 100 configured to receive the data signal DATA according to fourth-level pulse amplitude modulation (PAM4) shown in FIG. 1 is merely an example embodiment; example embodiments are not limited thereto, and example embodiments may also be applied to the receiver 100 configured to receive a data signal based on PAM8, PAM16, and the like.

The receiver 100 may include an interface 120 and a controller 140. The interface 120, may include a first analog-to-digital converter (ADC) 122, a second ADC 124, and a serializer-deserializer (SerDes, not shown). The receiver 100 may convert the data signal DATA, which is serially received, into digital data, and may parallelize the digital data. The interface 120 may provide the generated digital data to the controller 140. An analog-digital converting circuit may be collectively referred to including the first ADC 122 and the second ADC 124.

In some example embodiments, the interface 120 may further include an equalizer (not shown) connected to an input terminal of the analog-digital converting circuit. For example, the equalizer (not shown) may be implemented as a continuous time linear equalizer (CTLE), and through the implementation, an eye diagram may be enlarged by adjusting a gain for the data signal DATA at a frequency of interest in a frequency bandwidth of the channel CH.

The first ADC 122 and the second ADC 124 according to an example embodiment may perform analog-digital conversion with respect to the data signal DATA in a time-interleaving method. For example, the first ADC 122 may convert the data signal DATA in a first section into digital data, and the second ADC 124 may convert the data signal DATA, which is in a second section after the first section, into digital data. Thus, as the first ADC 122 converts the data signal DATA in an odd number section into the digital data and the second ADC 124 in an even number section into the digital data, conversion operations with respect to the data signal DATA in all sections may be performed.

For example, when the data signal DATA has a level corresponding to a symbol '00' in the first section, the first ADC 122 may convert the data signal DATA into first digital data including first most significant bit (MSB) data having a value of '0' and first least significant bit (LSB) data having a value of '0'. When the data signal DATA has a level corresponding to a symbol '01' in the second section, the second ADC 124 may convert the digital signal DATA into second digital data including a second most significant bit (MSB) data having a value of '0' and second least significant bit (LSB) data having a value of '1'.

The first ADC 122 and the second ADC 124 according to an example embodiment may mutually provide feedback for the decision feedback equalization (DFE) operation. In addition, each of the first ADC 122 and the second ADC 124 may adjust a reference voltage based on received feedback, and perform the analog-digital conversion operation by using the adjusted reference voltage.

The DFE operation may refer to an operation of adjusting a reference voltage used for analog-digital conversion for accurately distinguishing the data signal DATA considering attenuation of the data signal DATA that may occur according to characteristics of a channel CH, an operation environment of the electrical device 10, and the like.

In an example embodiment, the feedback may include higher bit data generated by each of the first ADC 122 and the second ADC 124, and the reference voltage may be used to distinguish lower bit data. Hereinafter, an example embodiment thereof will be described.

In an example embodiment, the first ADC 122 may provide the first MSB data, which is converted from the data signal DATA in the first section, to the second ADC 124. The second ADC 124 may adjust the reference voltage for distinguishing the second LSB data based on the second MSB data, which is converted from the data signal DATA in the second section after the first section, and the first MSB data. The second LSB data may be generated from the data signal DATA by using the adjusted reference voltage. The second ADC 124 may provide the second MSB data to the first ADC 122. The first ADC 122 may adjust the reference voltage for distinguishing third LSB data based on third MSB data, which is converted from the data signal DATA in a third section after the second section, and the second MSB data. Thus, the first ADC 122 and the second ADC 124 may mutually provide, as feedback, some bit data of the digital data generated by alternately performing the conversion operation, and may each adjust the reference voltage for distinguishing certain bit data based on the received feedback. Example embodiments thereof will be described below with reference to FIGS. 5 through 7B.

In an example embodiment, the first ADC 122 may provide, to the second ADC 124, the first digital data including the first MSB data converted from the data signal DATA in the first section and the first LSB data. For example, the first ADC 122 may sequentially generate the first MSB data and the first LSB data, and may provide the first MSB data and the first LSB data to the second ADC 124 in the order of generation. The second ADC 124 may determine a delta voltage based on the second MSB data, which is converted from the data signal DATA in the second section after the first section, and the first digital data, and may adjust the reference voltage for distinguishing the second LSB data by the determined delta voltage. The second ADC 124 may provide, to the first ADC 122, second digital data including the second MSB data converted from the data signal DATA in the second section and the second LSB data. For example, the second ADC 124 may sequentially generate the second MSB data and the second LSB data, and may provide the second MSB data and the second LSB data to the first ADC 122 in the order of generation. The first ADC 122 may determine a delta voltage based on the third MSB data, which is converted from the data signal DATA in the third section after the second section, and the second section, and may adjust the reference voltage for distinguishing the third LSB data by the determined delta voltage. Thus, the first ADC 122 and the second ADC 124 may mutually provide, as feedback, the digital data generated by alternately performing the conversion operation. The first ADC 122 and the second ADC 124 may each determine a delta voltage based on the received feedback, and adjust the reference voltage for distinguishing certain bit data by the determined delta voltage. Additional details thereof will be described below with reference to FIGS. 10A through 12B. The controller 140 may receive the digital data from the interface 120 and perform a data processing operation.

In an example embodiment, the first ADC 122 and the second ADC 124 may be implemented as successive approximation register (SAR)-ADCs. However, this is merely an example embodiment and is not limited thereto, and the first ADC 122 and the second ADC 124 may each be implemented as one of various ADCs capable of performing operations according to example embodiments.

The receiver 100 according to an example embodiment may efficiently perform the DFE operation for accurately distinguishing the data signal DATA based on the pulse amplitude modulation with a relatively simple configuration, and as a result, the receiver 100 may provide improved data reliability.

Figure 2:
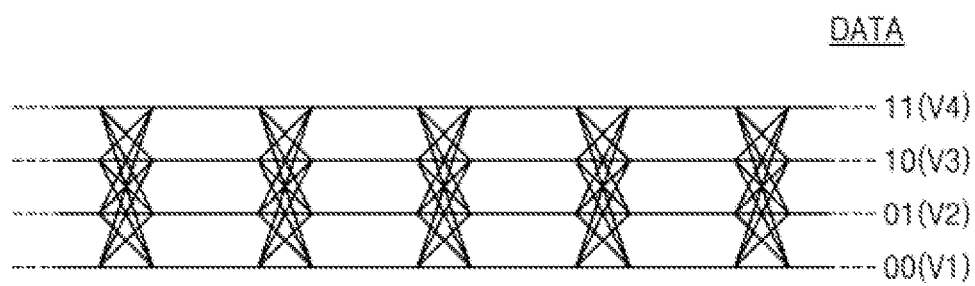
FIG. 2 is a diagram for describing a data signal based on pulse amplitude modulation.

FIG. 2 is a diagram for describing the data signal DATA based on pulse amplitude modulation. Although FIG. 2 shows the data signal DATA based on PAM4 having four levels, e.g., voltage levels, this is merely an example embodiment for convenience of understanding and is not limited thereto, and example embodiments may also be applied to the data signal DATA based on PAMn having eight or more levels.

Referring to FIG. 2, a first level V1 (which is a lowest level of the data signal DATA) may be mapped to two-bit data '00'. A fourth level V4 (which is a highest level of the data signal DATA) may be mapped to two-bit data '11'. Medium levels (that is, a second level V2 and a third level V3) of the data signal DATA may be respectively mapped to the two-bit data '01' and '10'. The above-described mapping of the first level V1 through the fourth level V4 to the data is mapping according to a gray code method. However, this is merely an example embodiment, and the mapping may be modified according to various purposes.

In the present specification, for convenience of understanding, example embodiments will be described mainly with reference to examples of the data signal DATA shown in FIG. 2. Thus, when the MSB data corresponding to the data signal DATA is changed from '0' to '1' or from '1' to '0', it is assumed that a degree of attenuation of the data signal DATA may be greater than when the MSB data stays same. Mapping between the data signal DATA and the first level V1 through the fourth level V4 may be changed according to coding methods, and example embodiments may also be adaptively applied to the data signal according to changed code methods.

Figure 3:
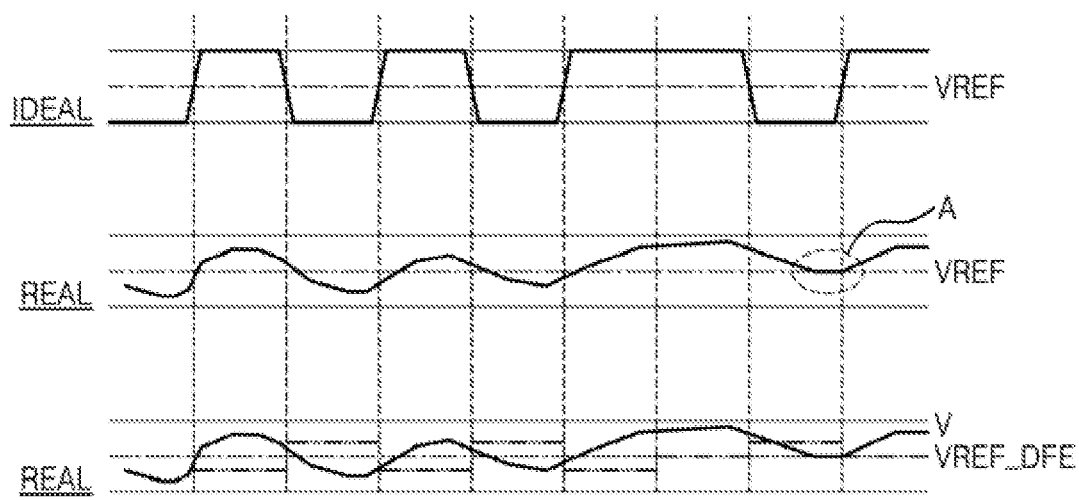
FIG. 3 is a timing chart for describing attenuation of a data signal, which is received by a receiver through a channel shown in FIG. 1, and a decision feedback equalization (DFE) operation.

FIG. 3 is a timing chart for describing attenuation of the data signal DATA received from the receiver 100 through the channel CH shown in FIG. 1 and a DFE operation.

Referring to FIG. 3, first, in an ideal case IDEAL, the data signal DATA may distinguish certain bit data by using a reference voltage VREF. However, in real cases REAL, due to attenuation of the data signal DATA, the bit data may not be accurately distinguished by the reference voltage VREF, as shown in region A. Considering the attenuation of the data signal DATA, the receiver 100 (see FIG. 1) may adjust the reference voltage VREF by performing the DFE operation, and may distinguish the bit data from the data signal DATA by using an adjusted reference voltage VREF_DFE.

Figure 4A:
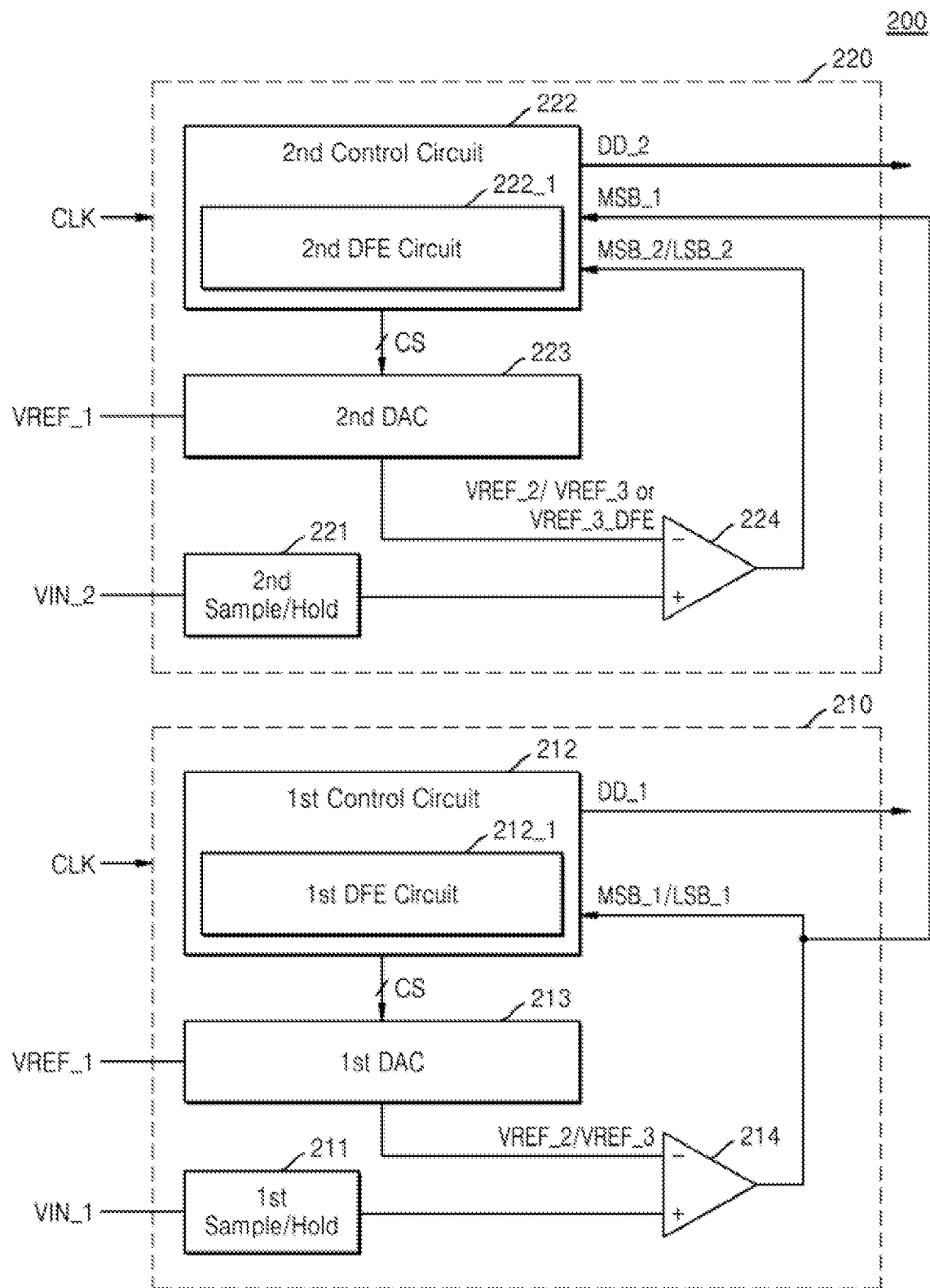
FIGS. 4A and 4B are each a block diagram of an interface according to an example embodiment.
Figure 4B:
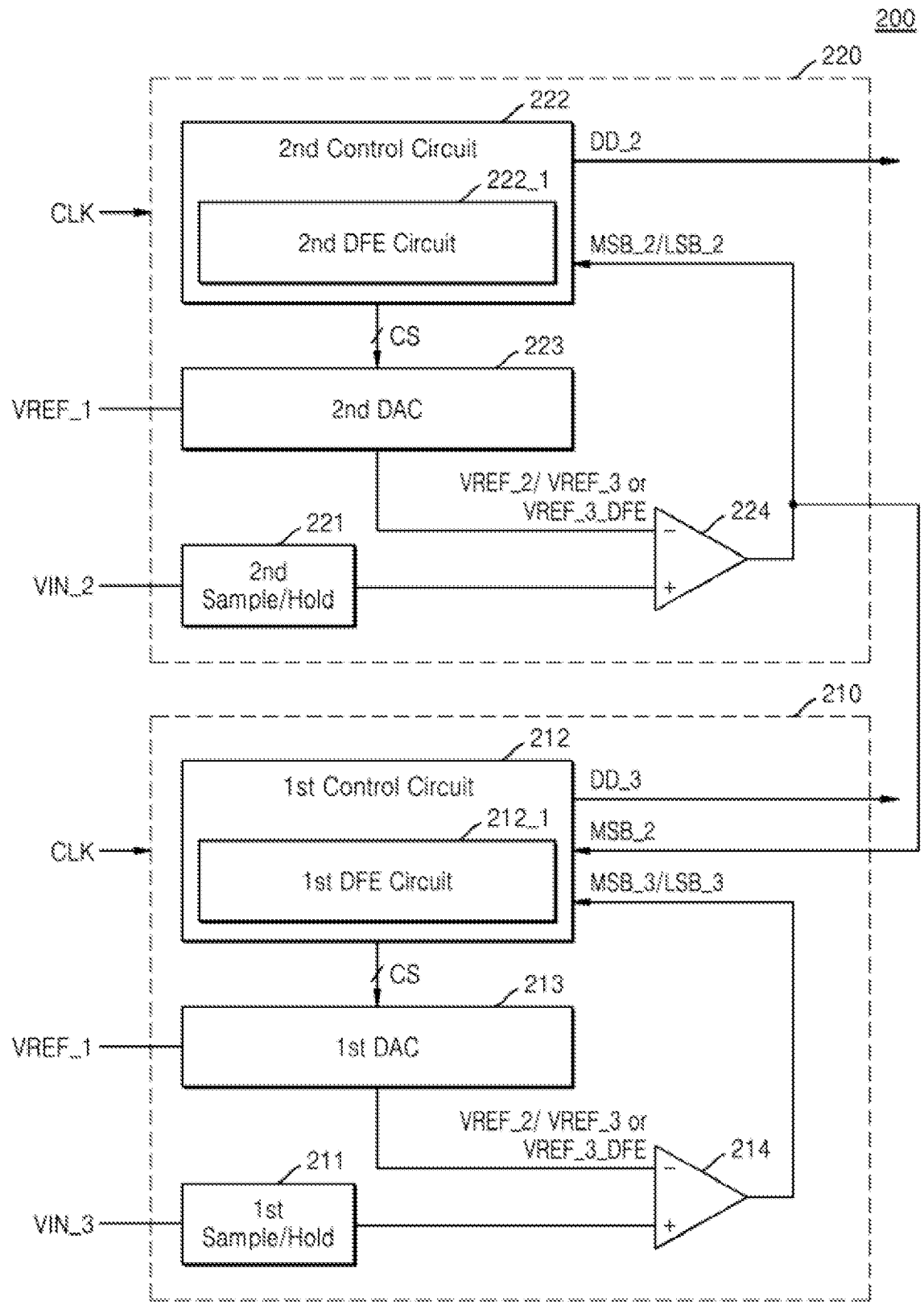

FIGS. 4A and 4B are each a block diagram of an interface 200 according to an example embodiment.

Referring to FIG. 4A, the interface 200 may include a first ADC 210 and a second ADC 220. The first ADC 210 may include a first sample/hold circuit 211, a first control circuit 212, a first digital-analog converter (DAC) 213, and a first comparator 214. The second ADC 220 may include a second sample/hold circuit 221, a second control circuit 222, a second DAC 223, and a second comparator 224. The first ADC 210 and the second ADC 220 may perform a conversion operation with respect to the data signal DATA in synchronization with a clock signal CLK. In an example embodiment, the first control circuit 212 and the second control circuit 222 may respectively include a first DFE circuit 212_1 and a second DFE circuit 222_1 to which example embodiments are applied.

The first sample/hold circuit 211 may perform a sampling operation by receiving a first input signal VIN_1 corresponding to the data signal in the first section. The first sample/hold circuit 211 may generate sample data from the first input signal VIN_1, and provide the sample data to the first comparator 214. The first control circuit 212 may provide, to the first DAC 213, a control signal CS for distinguishing the first MSB data MSB_1. The first DAC 213 may generate a second reference voltage VREF_2 from a first reference voltage VREF_1 in response to the control signal CS, and provide the second reference voltage VREF_2 to the first comparator 214. The first comparator 214 may generate the first MSB data MSB_1 by comparing the first sample data and the second reference voltage VREF_2, and may provide the first MSB data MSB_1 to the first control circuit 212 and the second control circuit 222 in the second ADC 220.

Next, the first control circuit 212 may provide, based on the first MSB data MSB_1, the control signal CS for distinguishing first LSB data LSB_1 to the first DAC 213, and the first DAC 213 may generate a third reference voltage VREF_3 from the first reference voltage VREF_1, in response to the control signal CS, and may provide the third reference voltage VREF_3 to the first comparator 214. The third reference voltage VREF_3 is used for distinguishing the first LSB data LSB_1, and may have different levels according to a value of the first MSB data MSB_1. For example, the third reference voltage VREF_3 may include one of the following: a level for distinguishing whether the data signal DATA in FIG. 2 is in the first level V1 or in the second level V2; and a level for distinguishing whether the data signal DATA is in the third level V3 or the fourth level V4. The first comparator 214 may generate the first LSB data LSB_1 by comparing first sample data and the third reference voltage VREF_3, and may provide the first LSB data LSB_1 to the first control circuit 212. The first control circuit 212 may output first digital data DD_1 including the first MSB data MSB_1 and the first LSB data LSB_1.

The second sample/hold circuit 221 may perform the sampling operation by receiving a second input signal VIN_2 corresponding to the data signal in the second section. The second sample/hold circuit 221 may generate second sample data from the second input signal VIN_2, and provide the second sample data to the second comparator 224. The second control circuit 222 may provide, to the second DAC 223, the control signal SC for distinguishing the second MSB data MSB_2. The second DAC 223 may generate the second reference voltage VREF_2 from the first reference voltage VREF_1 in response to the control signal CS, and provide the second reference voltage VREF_2 to the second comparator 224. The second comparator 224 may generate the second MSB data MSB_2 by comparing the second sample data to the second reference voltage VREF_2, and may provide the second MSB data MSB_2 to the second control circuit 222.

Although not shown in FIG. 4A, the second comparator 224 may provide the second MSB data MSB_2 to the first control circuit 212 of the first ADC 210, and details thereof will be described with reference to FIG. 4B.

In an example embodiment, the second DFE circuit 222_1 may provide the control signal CS for distinguishing second LSB data LSB_2 to the second DAC 223 based on the first MSB data MSB_1 and the second MSB data MSB_2. The second DAC 223 may generate the third reference voltage VREF_3 or an adjusted third reference voltage VREF_3_DFE from the first reference voltage VREF_1 in response to the control signal CS, and may provide the third reference voltage VREF_3 or the adjusted third reference voltage VREF_3_DFE to the second comparator 224. The adjusted third reference voltage VREF_3_DFE may refer to a reference voltage that is adjusted by a delta level having a certain positive or negative sign compared to the third reference voltage VREF_3 considering the attenuation of the data signal. For example, when the first MSB data MSB_1 and the second MSB data MSB_2 are equal to each other, the second DFE circuit 222_1 may provide, to the second DAC 223, the control signal CS for generating the third reference voltage VREF_3. When the first MSB data MSB_1 and the second MSB data MSB_2 are different from each other, the second DFE circuit 222_1 may provide, to the second DAC 223, the control signal CS for generating the adjusted third reference voltage VREF_3_DFE. Example embodiments of the adjusted third reference voltage VREF_3_DFE will be described below with reference to FIGS. 7A and 7B. The second comparator 224 may generate the second LSB data LSB_2 by comparing the second sample data with the third reference voltage VREF_3 or the adjusted third reference voltage VREF_3_DFE, and may provide the second LSB data LSB_2 to the second control circuit 222. The second control circuit 222 may output second digital data DD_2 including the second MSB data MSB_2 and the second LSB data LSB_2.

Referring to FIG. 4B, the first sample/hold circuit 211 may perform the sampling operation by receiving a third input signal VIN_3 corresponding to the data signal in the third section. The first sample/hold circuit 211 may generate third sample data from the third input signal VIN_3, and provide the third sample data to the first comparator 214. The first control circuit 212 may provide, to the first DAC 213, the control signal CS for distinguishing third MSB data MSB_3. The first DAC 213 may generate the second reference voltage VREF_2 from the first reference voltage VREF_1 in response to the control signal CS, and provide the second reference voltage VREF_2 to the first comparator 214. The first comparator 214 may generate the third MSB data MSB_3 by comparing the third sample data and the second reference voltage VREF_2, and may provide the third MSB data MSB_3 to the first control circuit 212.

In an example embodiment, the first DFE circuit 212_1 may provide the control signal CS for distinguishing third LSB data LSB_3 to the first DAC 213 based on the second MSB data MSB_2 and the third MSB data MSB_3. The first DAC 213 may generate the third reference voltage VREF_3 or the adjusted third reference voltage VREF_3_DFE from the first reference voltage VREF_1 in response to the control signal CS, and may provide the third reference voltage VREF_3 or the adjusted third reference voltage VREF_3_DFE to the first comparator 214.

For example, when the first MSB data MSB_1 and the second MSB data MSB_2 are equal to each other, the first DFE circuit 212_1 may provide, to the first DAC 213, the control signal CS for generating the third reference voltage VREF_3. When the second MSB data MSB_2 and the third MSB data MSB_3 are different from each other, the first DFE circuit 212_1 may provide, to the first DAC 213, the control signal CS for generating the adjusted third reference voltage VREF_3_DFE. The first comparator 214 may generate the third LSB data LSB_3 by comparing the third sample data with the third reference voltage VREF_3 and the adjusted third reference voltage VREF_3_DFE, and may provide the third LSB data LSB_3 to the first control circuit 212. The first control circuit 212 may output third digital data DD_3 including the third MSB data MSB_3 and the third LSB data LSB_3.

The interface 200 shown in FIGS. 4A and 4B is an example embodiment and is not limited thereto, and the interface 200 may include a greater number of ADCs or perform a conversion operation on the data signal based on various kinds of PAMs.

Figure 5:
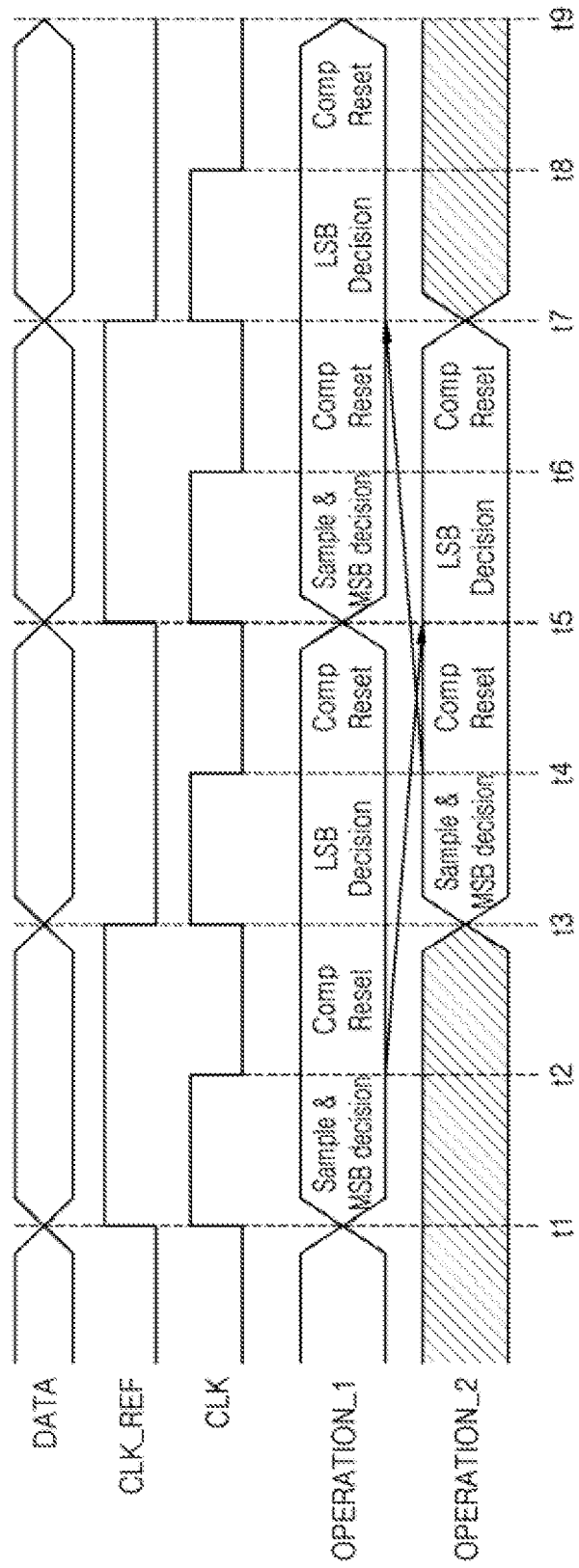
FIG. 5 is a timing chart for describing a conversion operation on a data signal according to an example embodiment.

FIG. 5 is a timing chart for describing conversion operations with respect to the data signal DATA according to an example embodiment. For convenience of explanation, refer to FIGS. 4A and 4B.

A first operation OPERATION_1 indicates a conversion operation performed by the first ADC 210. A second operation OPERATION_2 indicates a conversion operation performed by the second ADC 220.

The first ADC 210 and the second ADC 220 may perform the conversion operations in synchronization with the clock signal CLK. For example, the clock signal CLK may have a frequency higher than that of a reference clock signal CLK_REF of the receiver 100 (see FIG. 1). In FIG. 5, it is assumed that the frequency of the clock signal CLK is twice the frequency of the reference clock signal CLK_REF.

Referring to FIGS. 4A, 4B, and 5, the first ADC 210 may receive the data signal DATA in the first section from a first time point t1 to a third time point t3 as the first input signal VIN_1, and may perform a first conversion operation with respect to the first input signal VIN_1 from the first time point t1 to a fifth time point t5. The first conversion operation may include sampling the first input signal VIN_1, distinguishing the first MSB data MSB_1, resetting the first comparator 214, distinguishing the first LSB data LSB_1, and resetting the first comparator 214. The first ADC 210 may provide, to the second ADC 220, the first MSB data MSB_1 that is distinguished between the first time point t1 and a second time point t2.

The second ADC 220 may receive the data signal DATA in the second section from a third time point t3 to the fifth time point t5 as the second input signal VIN2, and may perform a second conversion operation with respect to the second input signal VIN_2 from the third time point t3 to a seventh time point t7. The second conversion operation may include sampling the second input signal VIN_2, distinguishing the second MSB data MSB_2, resetting the second comparator 224, distinguishing the second LSB data LSB_2, and resetting the second comparator 224. The second ADC 220 may adjust the third reference voltage VREF_3 for distinguishing the second LSB data LSB_2, based on the first MSB data MSB_1 received from the first ADC 210 and the second MSB data MSB_2 that is distinguished. The second ADC 220 may provide, to the first ADC 210, the second MSB data MSB_2 that is distinguished between the third time point t3 and a fourth time point t4.

The first ADC 210 may receive the data signal DATA in the third section between the fifth time point t5 and the seventh time point t7 as the third input signal VIN3, and perform a third conversion operation with respect to the third input signal VIN_3 from the fifth time point t5 to a ninth time point t9. The third conversion operation may include sampling the third input signal VIN_3, distinguishing the third MSB data MSB_3, resetting the first comparator 214, distinguishing the third LSB data LSB_3, and resetting the first comparator 214. The first ADC 210 may adjust the third reference voltage VREF_3 for distinguishing the third LSB data LSB_3, based on the second LSB data MSB_2 received from the second ADC 220 and the third MSB data MSB_3 that is distinguished.

In an example embodiment, some of the conversion operation of the first ADC 210 may overlap with some of the conversion operation of the second ADC 220. For example, the first conversion operation of the first ADC 210 and the second conversion operation of the second ADC 220 may overlap from the third time point t3 to the fifth time point t5, and the second conversion operation of the second ADC 220 and the third conversion operation of the first ADC 210 may overlap from the fifth time point t5 to the seventh time point t7. In an example embodiment, the conversion operation of the first ADC 210 and the conversion operation of the second ADC 220 may be performed in a 2-cycle of the clock signal.

In an example embodiment, the first ADC 210 and the second ADC 220 may alternately perform the conversion operations, and may mutually provide MSB data for adjusting the reference voltage that is used for distinguishing the LSB data.

Figure 6A:
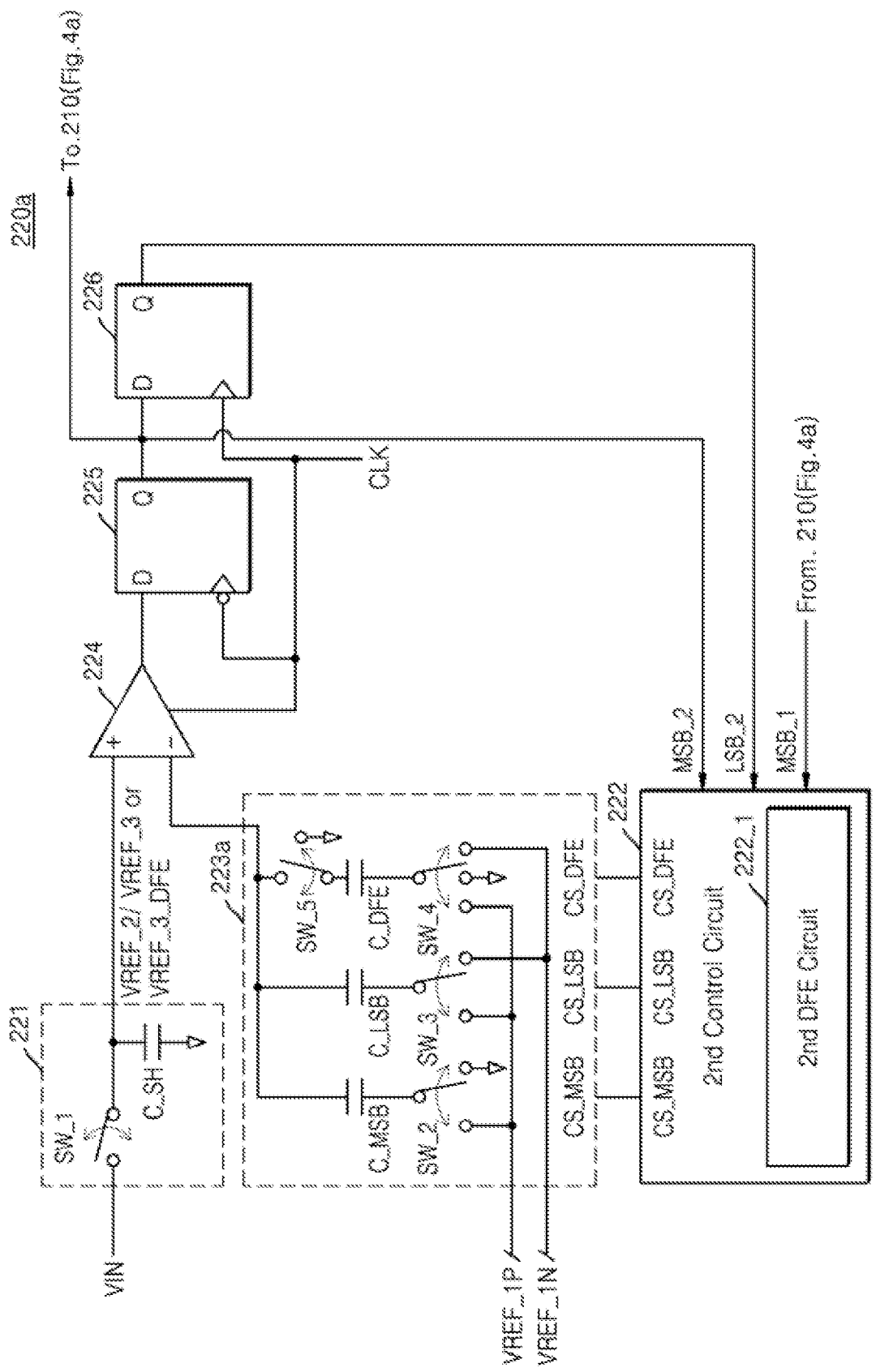
FIGS. 6A and 6B are each a diagram showing an example embodiment of a second analog-digital converter (ADC) shown in FIG. 4A according to an example embodiment.
Figure 6B:
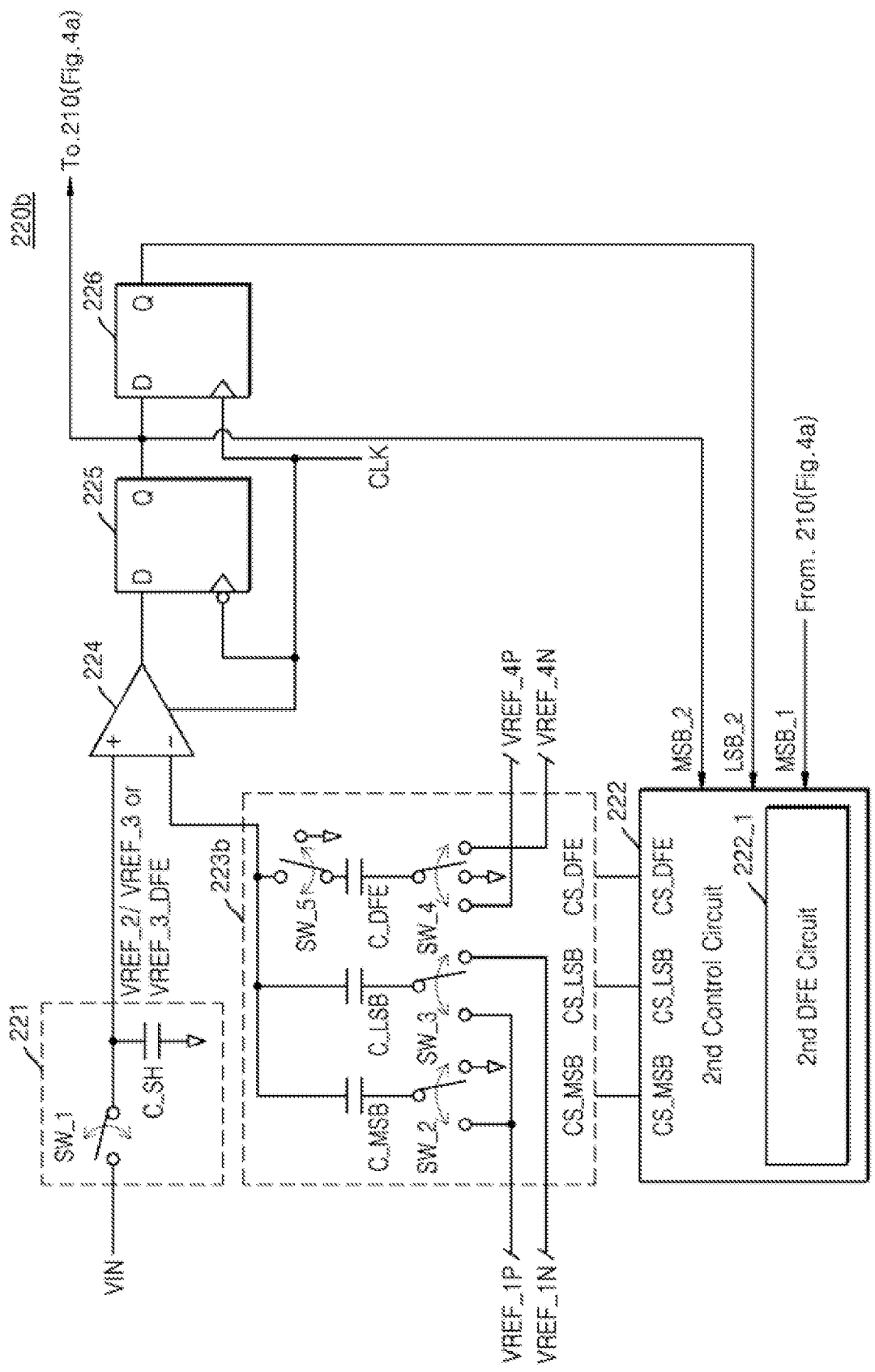

FIGS. 6A and 6B are each a diagram showing an implementation example of the second ADC 220 shown in FIG. 4A according to an example embodiment. Implementation embodiments of the second ADC 220a and the second ADC 220b described hereinafter may also be applied to the first ADC 210 shown in FIG. 4A.

Referring to FIG. 6A, the second ADC 220a may include the second sample/hold circuit 221, the second control circuit 222, the second DAC 223a, the second comparator 224, a first flip-flop 225, and a second flip-flop 226. The second sample/hold circuit 221 may include a capacitor C_SH and a first switch device SW_1. The second sample/hold circuit 221 may close the first switch SW_1 and charge the capacitor C_SH, thereby sampling the input signal VIN, and may open the first switch SW_1 and hold a charge being charged in the capacitor C_SH, thereby providing the sample data to the second comparator 224. The second control circuit 222 may include a second decision feedback equalizer (DFE) circuit 222_1. The second comparator 224, the first flip-flop 225, and the second flip-flop 226 may operate in synchronization with the clock signal CLK.

In an example embodiment, the second DAC 223a may include a first capacitor device C_MSB, a second capacitor device C_LSB, and a third capacitor device C_DFE, and a second switch device SW_2 through a fifth switch device SW_5. An end (or a bottom plate) of the first capacitor device C_MSB may be selectively connected to any one of a positive first reference voltage VREF_1P and a ground through the second switch device SW_2. An end of the second capacitor C_LSB may be selectively connected to any one of the positive reference voltage VREF_1P and a negative first reference voltage VREF_1N through the third switch device SW_3. The other ends (or top plates) of each of the first capacitor device C_MSB and the second capacitor device C_LSB may be connected to an input terminal of the second comparator 224. An end of the third capacitor device C_DFE may be selectively connected to any one of the positive first reference voltage VREF_1P, the ground, and the negative first reference voltage VREF_1N through the fourth switch device SW_4. The other end of the third capacitor device C_DFE may be selectively connected to any one of the input terminal of the second comparator 224 and the ground through the fifth switch device SW_5.

According to an example embodiment, capacitances may be predetermined such that capacitances of the first capacitor device C_MSB, the second capacitor device C_LSB, and the third capacitor device C_DFE may generate, through charge distribution, the second reference voltage VREF_2, the third reference voltage VREF_3, and the adjusted third reference voltage VREF_3_DFE for determining the MSB data and the LSB data from the input signal VIN. For example, the first capacitor device C_MSB may have a capacitance of '5C', the second capacitor device C_LSB may have a capacitance of '1C', and the third capacitor device C_DFE may have a capacitance of '2C'. An operation of the second DAC 223a will be described in detail with reference to FIGS. 7A and 7B.

The second control circuit 222 may generate control signals CS_MSB, CS_LSB, and CS_DFE for controlling connection in the second DAC 223a, and provide the control signals CS_MSB, CS_LSB, and CS_DFE to the second DAC 223a. For example, the second control circuit 222 may first control the second DAC 223a to generate the second reference voltage VREF_2 for distinguishing the second MSB data MSB_2. The second comparator 224 may receive the second reference voltage VREF_2 from the second DAC 223a, compare the second reference voltage VREF_2 with the sample data, and then output the second MSB data MSB_2 to the first flip-flop 225. The first flip-flop 225 may latch the second MSB data MSB_2 on a falling edge of the clock signal CLK, and output the second MSB data MSB_2 to the second control circuit 222 and the first ADC 210 shown in FIG. 4A.

The second DFE circuit 222_1 may receive the second MSB data MSB_2 from the first flip-flop 225, and may control the second DAC 223a to generate the third reference voltage VREF_3 or the adjusted third reference voltage VREF_3_DFE based on the second MSB data MSB_2 and the first MSB data MSB_1 received from the first ADC 210 shown in FIG. 4A. The second comparator 224 may receive the third reference voltage VREF_3 or the adjusted third reference voltage VREF_3_DFE from the second DAC 223a, compare the third reference voltage VREF_3 or the adjusted third reference voltage VREF_3_DFE with the held sample data, and may output the second LSB data LSB_2 to the first flip-flop 225. The first flip-flop 225 may latch the second LSB data LSB_2 on the falling edge of the clock signal CLK, and output the second LSB data LSB_2 to the second flip-flop 226. The second flip-flop 226 may latch the second LSB data LSB_2 at a rising edge of the clock signal CLK, and output the second LSB data LSB_2 to the second control circuit 222. The second control circuit 222 may output digital data including the second MSB data MSB_2 and the second LSB data LSB_2.

Referring to FIG. 6B, in a second DAC 223b of the second ADC 220b, unlike in FIG. 6A, an end of the third capacitor C_DFE may be selectively connected to any one of a positive fourth reference voltage VREF_4P, a negative fourth reference voltage VREF_4N, and the ground. An absolute magnitude of the fourth reference voltage (e.g., the positive fourth reference voltage VREF_4P and the negative fourth reference voltage VREF_4N) may be different from that of the first reference voltage (e.g., the positive first reference voltage VREF_1P and the negative first reference voltage VREF_1N). For example, the fourth reference voltage (e.g., the positive fourth reference voltage VREF_4P and the negative fourth reference voltage VREF_4N) may be regulated and generated from the first reference voltage (e.g., the positive first reference voltage VREF_1P and the negative first reference voltage VREF_1N).

The second ADC 220a in FIG. 6A and the second ADC 220b in FIG. 6B are each example embodiments and are not limited thereto, and may be variously implemented to adjust the third reference voltage VREF_3 used for distinguishing the second LSB data LSB_2 based on a result of comparing the first MSB data MSB_1 with the second MSB data MSB_2. The second comparator 224 may be implemented to receive differential input signals, and in this case, a configuration of the second DAC 223a may be modified such that the second comparator 224 may compare the differential input signals and distinguish the data signal.

Figure 7A:
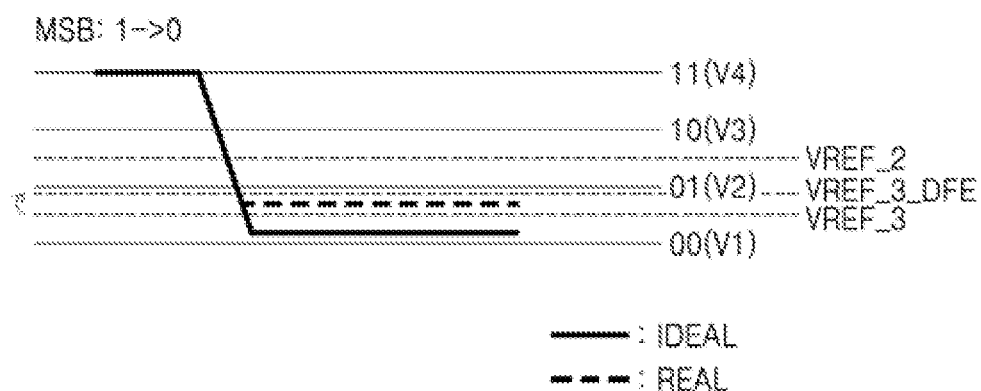
FIGS. 7A and 7B are each a diagram for describing a reference voltage generated in a second digital-analog converter (DAC) shown in FIG. 6A.
Figure 7B:
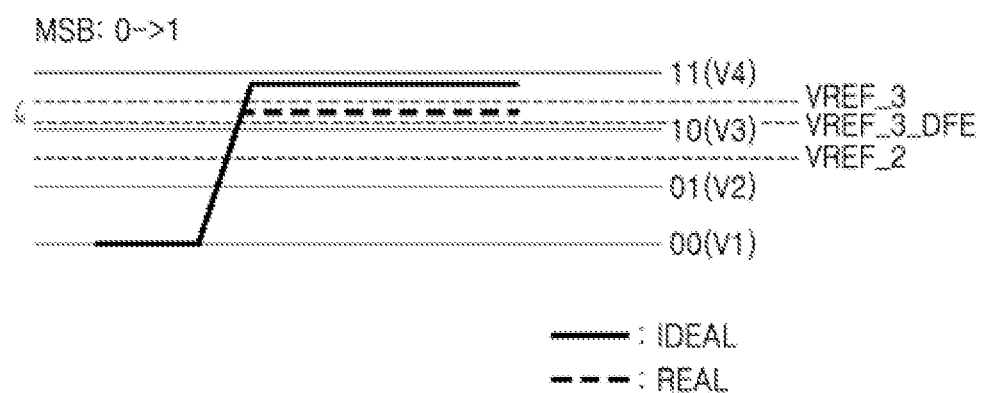

FIGS. 7A and 7B are diagrams for describing the reference voltage generated by the second DAC 223a shown in FIG. 6A. Hereinafter, for convenience of understanding, refer to FIG. 6A.

Referring to FIG. 7A, the second DAC 223a may generate the second reference voltage VREF_2 for distinguishing the second MSB data MSB_2, and provide the second reference voltage VREF_2 to the second comparator 224. From the data signal in an ideal case IDEAL, the second LSB LSB_2 may be distinguished by using the third reference voltage VREF_3. However, in a real case REAL, due to the attenuation of the data signal, distinguishing of the second LSB data LSB_2 between the first level V1 and the second level V2 by using the third reference voltage VREF_3 may be less accurate.

In an example embodiment, when the first MSB data MSB_1 is '1' and the second MSB data MSB_2 is '0', the second DAC 223a may generate the adjusted third reference voltage VREF_3_DFE that is adjusted by a certain delta level from the third reference voltage VREF_3, and provide the adjusted third reference voltage VREF_3_DFE to the second comparator 224. For example, in the second DAC 223a, an end of the first capacitor device C_MSB may be connected to the ground, an end of the second capacitor device C_LSB may be connected to the positive first reference voltage VREF_1P, an end of the third capacitor device C_DFE may be connected to the positive first reference voltage VREF_1P, and the other end of the third capacitor device C_DFE may be connected to the input terminal of the second comparator 224. The adjusted third reference voltage VREF_3_DFE may have a level appropriate for distinguishing the second LSB data LSB_2 between the first level V1 and the second level V2 from the attenuated data signal.

Referring to FIG. 7B, the second DAC 223a may generate the second reference voltage VREF_2 for distinguishing the second MSB data MSB_2, and provide the second reference voltage VREF_2 to the second comparator 224. From the data signal in an ideal case IDEAL, the second LSB data LSB_2 may be distinguished by using the third reference voltage VREF_3. However, in a real case REAL, due to the attenuation of the data signal, distinguishing of the second LSB data LSB_2 between the third level V3 and the fourth level V4 by using the third reference voltage VREF_3 may be less accurate.

In an example embodiment, when the first MSB data MSB_1 is '0 and the second MSB data MSB_2 is '1', the second DAC 223a may generate the adjusted third reference voltage VREF_3_DFE adjusted downward by a certain delta level from the third reference voltage VREF_3, and provide the adjusted third reference voltage VREF_3_DFE to the second comparator 224. For example, in the second DAC 223a, an end of the first capacitor device C_MSB may be connected to the positive reference voltage VREF_1P, an end of the second capacitor device C_LSB may be connected to the negative first reference voltage VREF_1N, an end of the third capacitor device C_DFE may be connected to the positive first reference voltage VREF_1P, and the other end of the third capacitor device C_DFE may be connected to the input terminal of the second comparator 224.

The adjusted third reference voltage VREF_3_DFE shown in FIGS. 7A and 7B is merely an example and is not limited thereto, and may be adjusted upward or downward by various sizes of delta levels for accurately distinguishing the second LSB data LSB_2.

Figure 8:
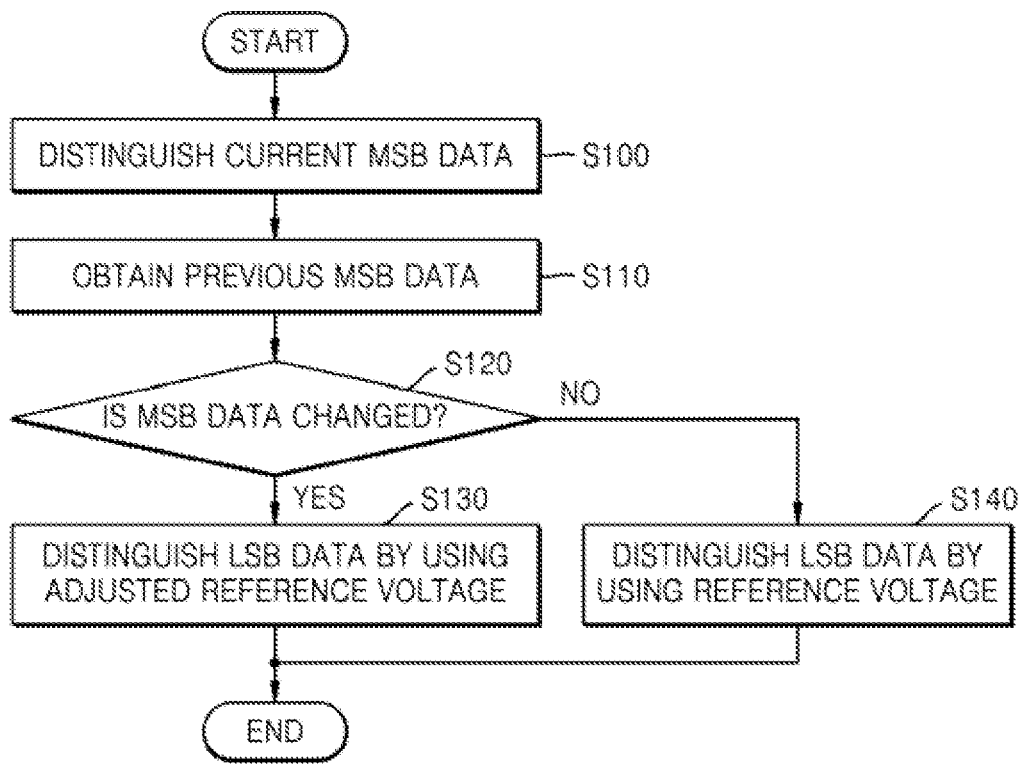
FIG. 8 is a flowchart of an operation of an analog-digital converting circuit according to an example embodiment.

FIG. 8 is a flowchart of an operation of the analog-digital converting circuit according to an example embodiment. Hereinafter, it is assumed that the analog-digital converting circuit includes the first ADC and the second ADC.

Referring to FIG. 8, in operation S100, the first ADC may distinguish current MSB data from a data signal in a current section.

In operation S110, the first ADC may obtain, from the second ADC, previous MSB data distinguished from a data signal in a previous section.

In operation S120, the first ADC may compare the current MSB data with the previous MSB data and distinguish whether the MSB data is changed. Thus, the first ADC may distinguish whether a value of the current MSB data is equal to or different from that of the previous MSB data.

When a result of operation S120 is 'YES', successively in operation S130, the first ADC may adjust a reference voltage used for distinguishing the LSB data, and may distinguish the LSB data by using the adjusted reference voltage.

When a result of operation S120 is 'NO', successively in operation S140, the first ADC may distinguish the LSB data by using the reference voltage without an additional adjustment.

Figure 9A:
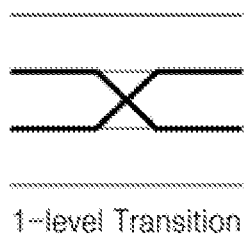
FIGS. 9A through 9C are each a diagram for describing level transition of a data signal based on fourth level pulse amplitude modulation (PAM4)
Figure 9B:
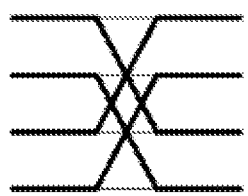
Figure 9C:
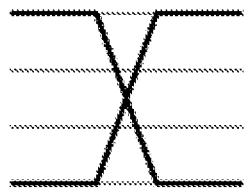

FIGS. 9A through 9C are each a diagram for describing level transition of the data signal based on PAM4.

Referring to FIGS. 9A through 9C, the MSB data may be changed in some cases when 1-level transition is performed, when 2-level transition is performed, or when 3-level transition is performed with respect to the data signal based on PAM4.

Degrees of attenuation may be different in a case where 2-level transition or higher level transition is performed on the data signal relative to a case where 1-level transition is performed on the data signal. Accordingly, the analog-digital converting circuit according to example embodiments may change degrees of adjustment of the reference voltage for distinguishing the LSB data in the case where 2-level transition or higher level transition is performed on the data signal and the case where 1-level transition is performed.

For example, when the 2-level transition or higher level transition is performed, the analog-digital converting circuit may adjust the reference voltage by a first delta level, and when 1-level transition is performed on the data signal, the analog-digital converter may adjust the reference voltage by a second delta level. The first delta level and the second delta level may be different from each other; for example, the first delta level may be greater than the second delta level.

Furthermore, in some example embodiments, the first delta level may be less than the second delta level.

Figure 10A:
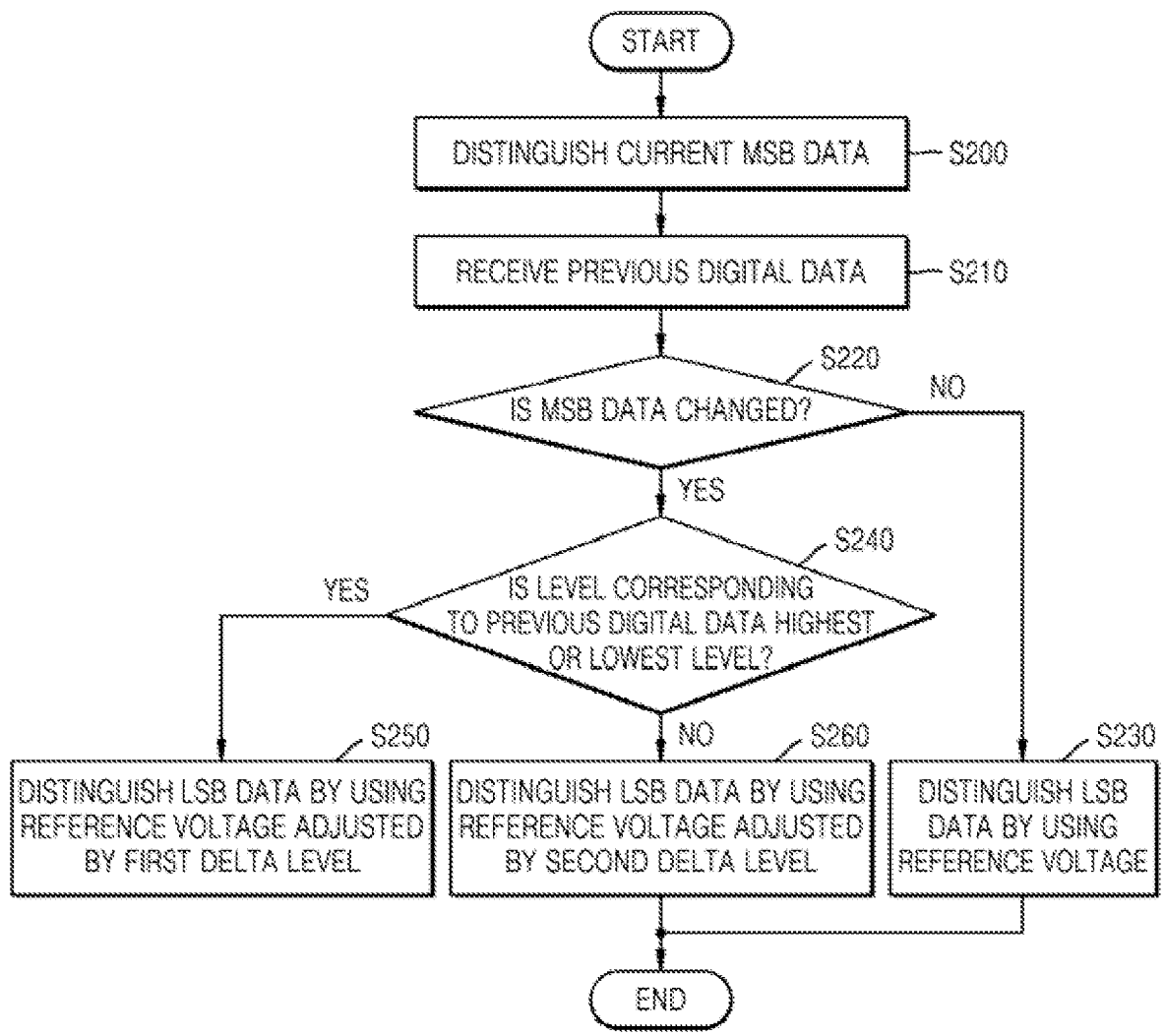
FIGS. 10A and 10B are each a diagram for describing an analog-digital converting circuit configured to change degrees of adjustment of a reference voltage according to a level transition degree of a data signal, according to an example embodiment.
Figure 10B:
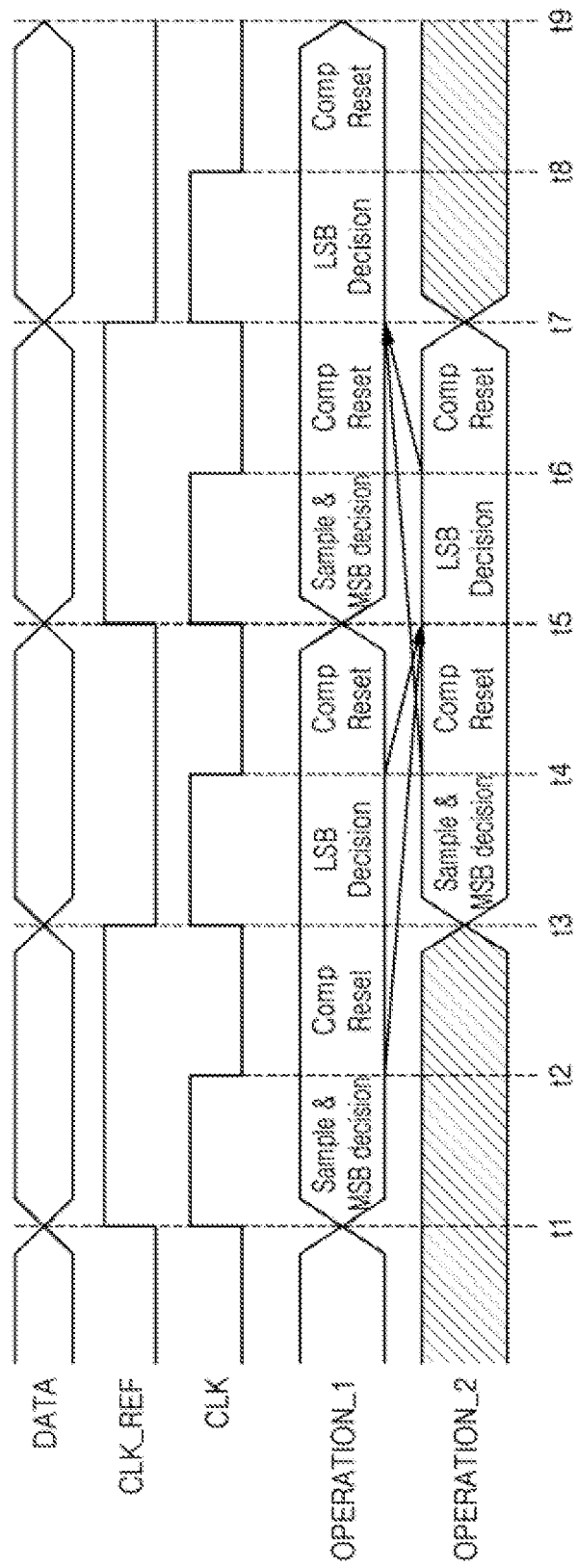

FIGS. 10A and 10B are each a diagram for describing operation of the analog-digital converting circuit configured to change degrees of adjustment of the reference voltage according to a level transition degree of a data signal, according to an example embodiment. Hereinafter, it is assumed that the analog-digital converting circuit includes the first ADC and the second ADC.

Referring to FIG. 10A, in operation S200, the first ADC may distinguish current MSB data from a data signal in a current section.

In operation S210, the first ADC may obtain, from the second ADC, previous digital data including previous MSB data, which is distinguished from a data signal in a previous section, and previous LSB data.

In operation S220, the first ADC may compare the current MSB data to the previous data and distinguish whether the MSB data is changed.

When a result of operation S220 is 'NO', successively in operation S230, the first ADC may distinguish the LSB data by using the reference voltage without an additional adjustment.

When a result of operation S220 is 'YES', the first ADC may determine, in operation S240, whether a level corresponding to the previous digital data is a highest level or a lowest level. Thus, when the level corresponding to the previous digital data is the highest level or the lowest level, the first ADC may distinguish that 2-level transition or higher level transition is performed with respect to the data signal, and when the level corresponding to the previous digital data is a medium level, the first ADC may distinguish that 1-level transition is performed with respect to the data signal. However, operation S240 is merely an example embodiment, and various methods may be used to distinguish whether 2-level transition or higher level transition is performed on the data signal.

When a result of operation S240 is 'YES', the first ADC may distinguish LSB from a data signal in the current section by using the reference voltage adjusted by the first delta level (operation S250).

When a result of operation S240 is 'NO', the first ADC may distinguish the LSB data from the data signal in the current section by using the reference voltage adjusted by the second delta level (operation S260).

Referring to FIG. 10B, for an operation as shown in FIG. 10A, the first ADC may receive previous MSB data and previous LSB from the second ADC before distinguishing the LSB data, wherein the previous MSB data and the previous LSB data are distinguished from the data signal DATA in a previous section (for example, the third time point t3 through the fifth time point t5). The second ADC may receive MSB data and LSB data before distinguishing the LSB data from the data signal DATA in the previous section (for example, the fifth time point t5), wherein the MSB data and the LSB data are distinguished from the data signal DATA from the first time point t1 to the third time point by the first ADC.

Figure 11A:
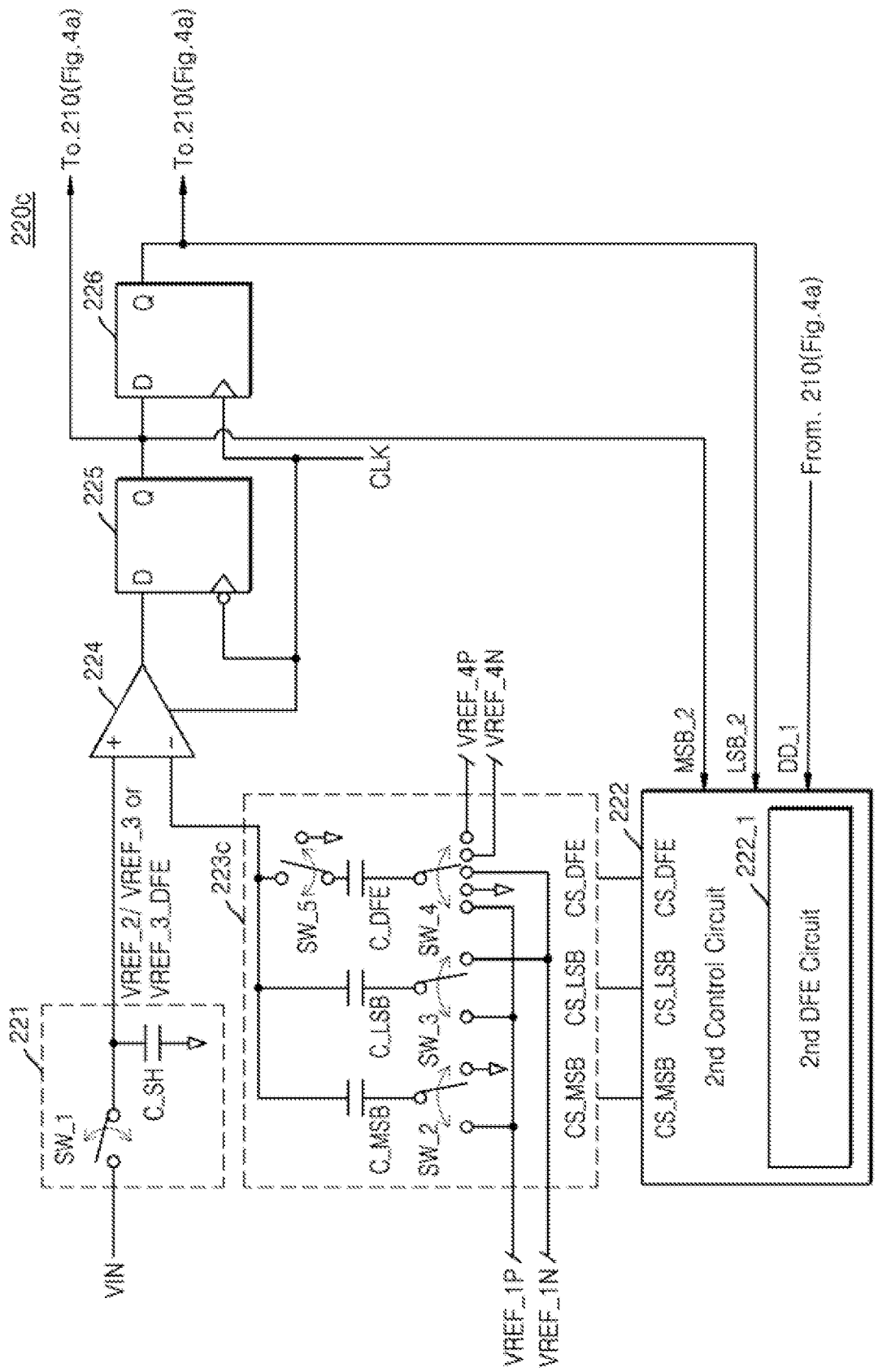
FIGS. 11A and 11B are each a diagram of implementation of the second ADC shown in FIG. 4A, according to an example embodiment.
Figure 11B:
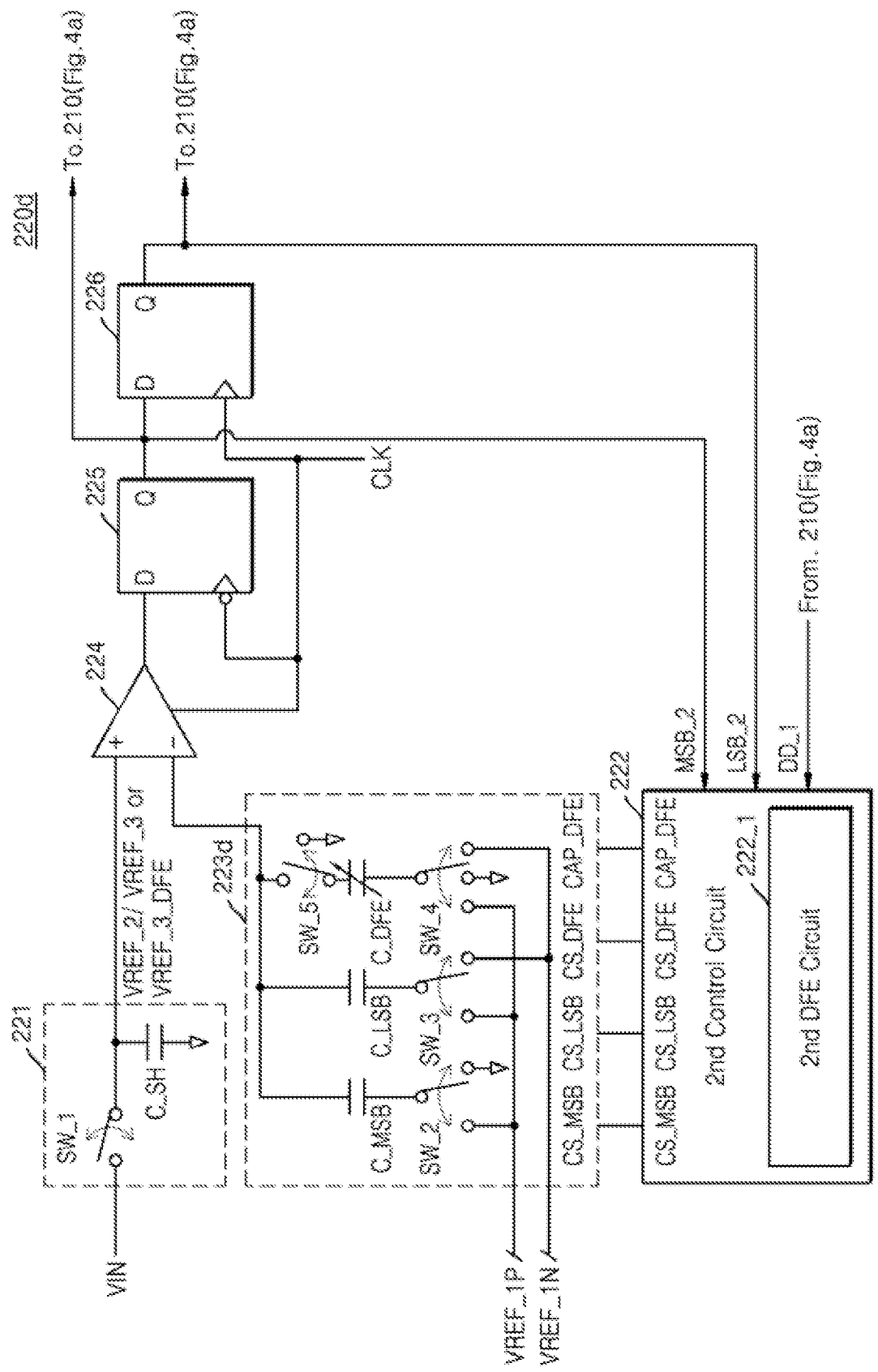

FIGS. 11A and 11B are each a diagram showing an implementation example of the second ADC 220 shown in FIG. 4A according to an example embodiment. The implementation example of the second ADCs 220c and 220d described hereinafter may also be applied to the first ADC 210 shown in FIG. 4A. In addition, descriptions that are the same as those of FIGS. 6A and 6B are omitted.

Referring to FIG. 11A, unlike in FIG. 6A, in the second DAC 223c of the second ADC 220c, an end of the third capacitor device C_DFE may be selectively connected to the positive first reference voltage VREF_1P, the ground, the negative first reference voltage VREF_1N, the negative fourth reference voltage VREF_4N, and the positive fourth reference voltage VREF_4P. An absolute magnitude of the fourth reference voltage (e.g., the positive fourth reference voltage VREF_4P and the negative fourth reference voltage VREF_4N) may be different from that of the first reference voltage (e.g., the positive first reference voltage VREF_1P and the negative first reference voltage VREF_1N). For example, the fourth reference voltage (e.g., the positive fourth reference voltage VREF_4P and the negative fourth reference voltage VREF_4N) may be regulated and generated from the first reference voltage (e.g., the positive first reference voltage VREF_1P and the negative first reference voltage VREF_1N).

For example, in the second DAC 223c, to generate the adjusted third reference voltage VREF_3_DFE adjusted by the first delta voltage, the third capacitor device C_DFE may be connected to the positive fourth reference voltage VREF_4P or the negative fourth reference voltage VREF_4N. In the second DAC 223c, to generate the adjusted third reference voltage VREF_3_DFE adjusted by the second delta voltage, the third capacitor device C_DFE may be connected to the positive first reference voltage VREF_1P or the negative first reference voltage VREF_1N.

In an example embodiment, the second DFE circuit 222_1 may receive the first digital signal DD_1 from the first ADC 210 (see FIG. 4A), and may generate, based on the first digital signal DD_1, the control signals CS_MSB, CS_LSB, and CS_DFE for adjusting the third reference voltage VREF_3 for distinguishing the second LSB data LSB_2. The second ADC 220c may provide the second MSB data MSB_2 and the second LSB data LSB_2 that are generated to the first ADC 210 (see FIG. 4A), and the first ADC 210 (see FIG. 4A) may adjust the reference voltage for determining the third LSB data, based on the second MSB data MSB_2 and the second LSB data LSB_2.

Referring to FIG. 11B, unlike in FIG. 11A, in the second DAC 223d of the second ADC 220c, the third capacitor device C_DFE, which is a variable capacitor device, may be selectively connected to any one of the positive first reference voltage VREF_1P, the ground, and the negative first reference voltage VREF_1N.

For example, the third capacitor device C_DFE may have a first capacitance such that the second DAC 223d generates the adjusted third reference voltage VREF_3_DFE that is adjusted by the first delta voltage, and the third capacitor device C_DFE may have a second capacitance such that the second DAC 223d generates the adjusted third reference voltage VREF_3_DFE that is adjusted by the second delta voltage.

The second control circuit 222 may generate the control signals CS_MSB, CS_LSB, and CS_DFE for controlling connection in the second DAC 223d, and provide the control signals CS_MSB, CS_LSB, and the CS_DFE to the second DAC 223d. The control signals CS_MSB, CS_LSB, and CS_DFE may further include a signal CS_DFE for adjusting a capacitance of the third capacitor device C_DFE.

The second ADC 220c in FIG. 11A and the second ADC 220d in FIG. 11B are merely example embodiments and are not limited thereto, and may be variously implemented to adjust the third reference voltage VREF_3 used for distinguishing the second LSB data LSB_2 based on a comparison result between the first digital data DD_1 and the second MSB data MSB_2.

Figure 12:
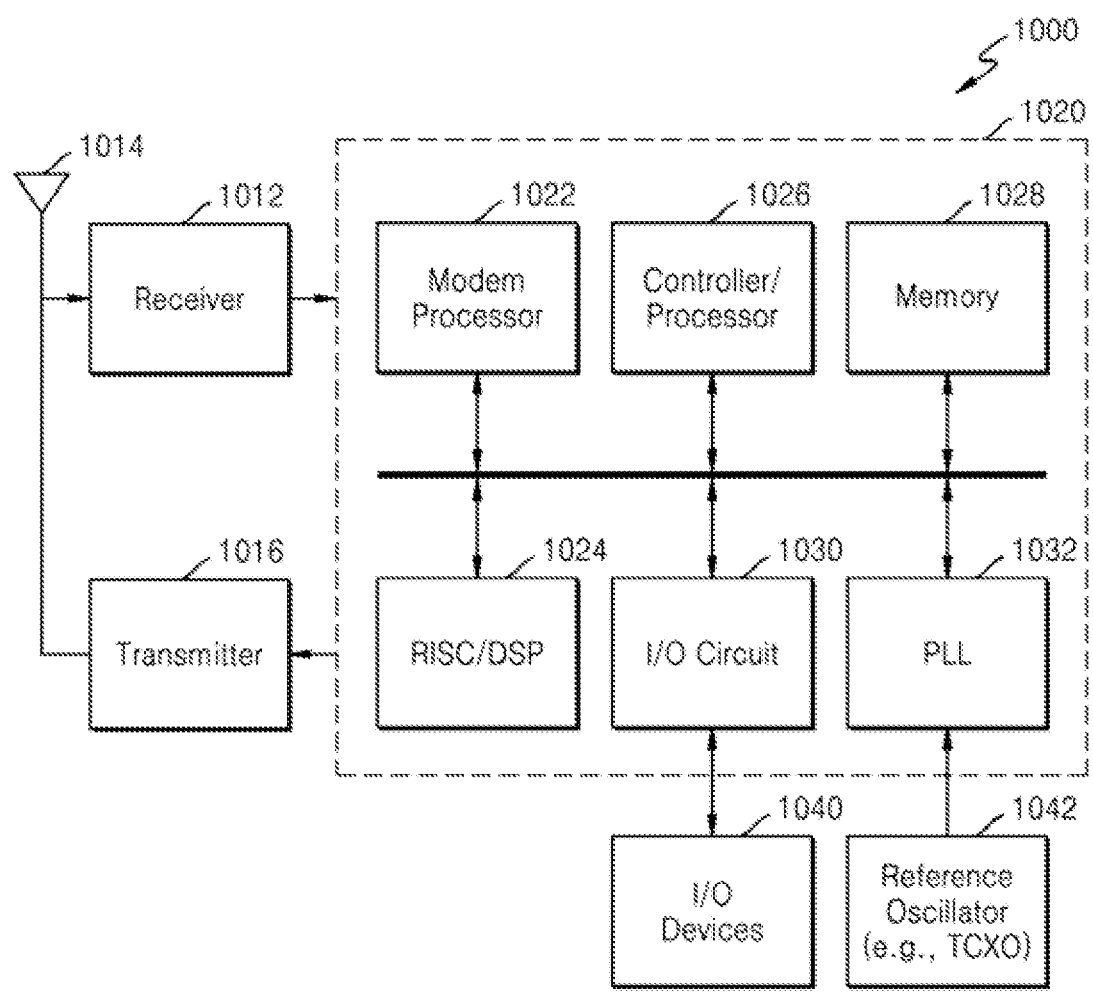
FIG. 12 is a block diagram of a communication device according to an example embodiment.

FIG. 12 is a block diagram of a communication device 1000 according to an example embodiment.

Referring to FIG. 12, the communication device 1000 may include a receiver 1012, a transmitter 1106, a communication module 1020, an antenna 1014, one or more input/output devices 1040, and a reference oscillator 1042.

The receiver 1012 may include an analog-digital converting circuit configured to perform an analog-digital conversion operation according to example embodiments described with reference to FIGS. 1 through 11B. The receiver 1012 may convert an analog signal, which is received from outside through the antenna 1014, to a digital signal by using the analog-digital converting circuit, and may provide the digital signal to the communication module 1020.

The transmitter 1016 may convert the digital signal that is received from the communication module into an analog signal, and may output the analog signal outside through the antenna 1014.

The communication module 1020 may include a modem processor 1022, a RISC/DSP 1024, a controller/processor 1026, a memory 1028, an input/output circuit 1030, and a phase locked loop (PLL) 1032.

The modem processor 1022 may perform processing operations such as encoding, modulation, demodulation, and decoding for transmitting and receiving data. The RISC/DSP 1024 may perform general or specialized processing operations in the communication device 1000. The controller/processor 1026 may control blocks in the communication module 1020. The memory 1028 may store data and various instruction codes. The input/output circuit 1030 may communicate with the external input/output device 1040. The input/output circuit 1030 may include the analog-digital converter configured to perform the analog-digital conversion operation according to the embodiments described with reference to FIGS. 1 through 11. The input/output circuit 1030 may convert a data signal, which is received from the external input/output device 1040, into a digital signal by using the analog-digital converting circuit. The phase locked loop 1032 may perform a frequency modulation operation by using a frequency signal received from a reference oscillator 1042. The communication module 1020 may perform a processing operation for communication by using an output signal generated by the phase locked loop 1032.

The reference oscillator 1042 may be implemented as a crystal oscillator (XO), a voltage controlled crystal oscillator (VCXO), a temperature compensated crystal oscillator (TCXO), and the like.

Figure 13:
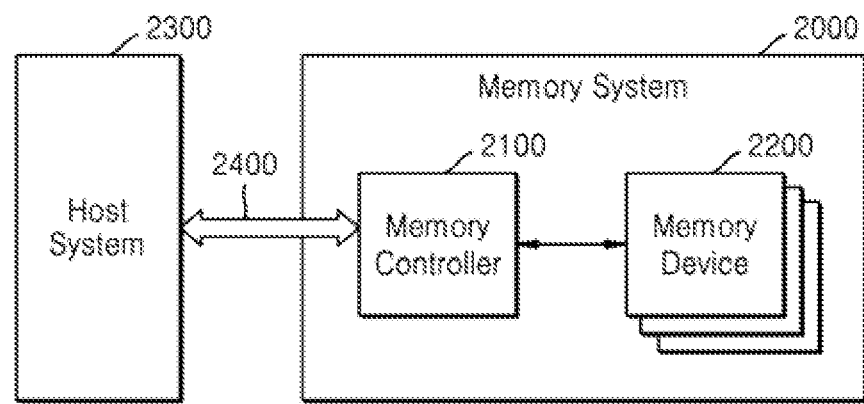
FIG. 13 is a block diagram of a system according to an example embodiment.

FIG. 13 is a block diagram of a system according to an example embodiment.

Referring to FIG. 13, a memory system 2000 and a host system 2300 may communicate with each other through an interface 2400. The memory system 2000 may include a memory controller 2100 and memory devices 2200.

The interface 2400 may use an electrical signal and/or an optical signal, and may be implemented, as non-limited examples, as a serial advanced technology attachment (SATA) interface, a SATA express (SATAe) interface, a serial attached small computer system interface (SCSI) (SAS), a universal serial bus (USB) interface, or combinations thereof. The host system 2300 and the memory controller 2100 may include a SerDes for serial communication.

In some example embodiments, the memory system 2000 may communicate with the host system 2300 by being removably combined with the host system 2300. The memory device 2200 may be a volatile memory or non-volatile memory, and the memory system 2000 may also be referred to as a storage system. For example, as non-limiting examples, the memory system may be implemented as a solid-state drive or solid-state disk (SSD), an embedded SSD (eSSD), a multimedia card (MMC), an embedded multimedia card (eMMC), and the like. The memory controller 2100 may control the memory devices 2200 in response to a request received from the host system 2300 through the interface 2400.

The analog-digital converter according to example embodiments may be included in each of the memory controller 2100, the memory devices 2200, and the host system 2300. For example, the memory controller 2100, the memory devices 2200, and the host system 2300 may receive the PAMn-based data signal, and convert the data signal into the digital data according to example embodiments.

Figure 14:
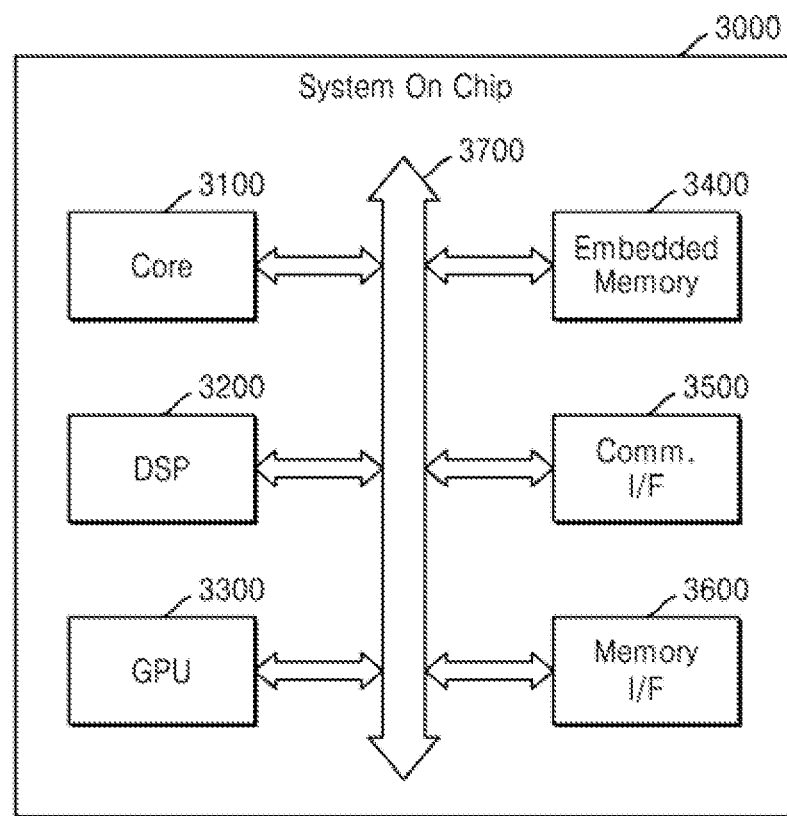
FIG. 14 is a block diagram of a system-on-chip according to an example embodiment.

FIG. 14 is a block diagram of a system-on-chip 3000 according to an example embodiment.

The system-on-chip (SoC) 3000 may refer to an integrated circuit in which components of a computing system or other electrical systems are integrated. For example, as one of the SoC 3000, an application processor AP may include a processor and components for other functions.

Referring to FIG. 14, the system-on-chip 3000 may include a core 3100, a digital signal processor (DSP) 3200, a graphic processing unit (GPU) 3300, an embedded memory 3400, a communication interface 3500, and a memory interface 3600. Components of the system-on-chip 3000 may communicate with one another through a buss 3700.

The core 3100 may process the instructions and control operations of the components included in the system-on-chip 3000. For example, the core 3000 may drive the operating system and execute applications on the operating system by processing a series of instructions. The DSP 3200 may generate data by processing a digital signal, e.g., a digital signal provided from the communication interface 3500. The GPU 3300 may generate data for images output through a display device using image data provided by the embedded memory 3400 or the memory interface 3600, or may encode the image data. The embedded memory 3400 may store data for operations of the core 3100, the DSP 3200, and the GPU 3300. The memory interface 3600 may provide an interface for an external memory of the SoC, e.g., dynamic random access memory (DRAM), flash memory, and the like.

The communication interface 3500 may provide serial communication with the outside of the SoC 3000. For example, the communication interface 3500 may access the Ethernet and include a SerDes for serial communication.

The analog-digital converting circuit according to example embodiments may be applied to the communication interface 3500 or the memory interface 3600. For example, the communication interface 3500 or the memory interface 3600 may receive the PAMn-based data signal, and may convert the data signal into the digital data according to example embodiments.

By way of summation and review, studies have been conducted for increasing the reliability of a received data signal by performing equalization with respect to the received data signal at a receiving terminal configured to receive the data signal.

As described above, embodiments may provide a receiver including a plurality of analog-digital converters that convert a data signal into digital data in a time-interleaving method, the analog-digital converters being configured to improve reliability by mutually transmitting and receiving feedback for level adjustment of a reference voltage used for a conversion operation, and an electronic device including the receiver.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A receiver, comprising:
   an interface configured to receive a data signal based on 4-level pulse amplitude modulation (PAM-4),
   wherein the interface includes:
      a first analog-digital converter (ADC) having a first control circuit; and
      a second ADC having a second control circuit,
   wherein an output of the first ADC is connected to the second control circuit,
   wherein an output of the second ADC is connected to the first control circuit, and
   wherein the first ADC and the second ADC perform conversion operations alternately.

2. The receiver as claimed in claim 1, wherein the first ADC and the second ADC are successive-approximation register (SAR)-ADCs.

3. The receiver as claimed in claim 1, wherein a conversion operation of the first ADC is performed at a rising edge of a clock signal and a conversion operation of the second ADC is performed at a falling edge of the clock signal.

4. The receiver as claimed in claim 1, wherein the conversion operations are performed in synchronization with a clock signal.

5. The receiver as claimed in claim 1, wherein the interface receives differential input signals.

6. The receiver as claimed in claim 1, wherein a conversion operation of the first ADC overlaps with a conversion operation of the second ADC.

7. The receiver as claimed in claim 1, further comprising an array of capacitors.

8. The receiver as claimed in claim 1, wherein the first ADC or the second ADC is configured to adjust a reference voltage.

9. The receiver as claimed in claim 1, wherein the first ADC or the second ADC includes at least one flip-flop.

10. An interface, comprising:
    a first analog-digital converter (ADC) having:
       a first sampling switch configured to receive an input signal;
       a first digital-analog converter (DAC) comprising an array of capacitors;
       a first comparator connected to the first sampling switch and the first DAC;
       a first flip-flop configured to receive output of the first comparator; and
       a first control circuit connected to the first DAC;
    a second ADC having:
       a second sampling switch configured to receive the input signal;
       a second DAC having an array of capacitors;
       a second comparator connected to the second sampling switch and the second DAC;
       a second flip-flop configured to receive an output of the second comparator; and
       a second control circuit connected to the second DAC, and
    wherein the second control circuit is configured to receive an output of the first flip-flop,
    wherein the first control circuit is configured to receive an output of the second flip-flop, and
    wherein a conversion operation of the second ADC is delayed compared to a conversion operation of the first ADC.

11. The interface as claimed in claim 10, wherein the first ADC and the second ADC are successive-approximation register (SAR)-ADCs.

12. The interface as claimed in claim 10, wherein a conversion operation of the first ADC is performed at a rising edge of a clock signal and a conversion operation of the second ADC is performed at a falling edge of the clock signal.

13. The interface as claimed in claim 10, wherein the conversion operations are performed in synchronization with a clock signal.

14. The interface as claimed in claim 10, wherein the interface receives differential input signals.

15. The interface as claimed in claim 10, wherein a conversion operation of the first ADC overlaps with a conversion operation of the second ADC.

16. The interface as claimed in claim 10, further having an array of capacitors.

17. The interface as claimed in claim 10, wherein the first ADC or the second ADC is configured to adjust a reference voltage.

18. The interface as claimed in claim 10, wherein the interface is configured to receive a data signal based on 4-level pulse amplitude modulation (PAM-4).

19. The interface as claimed in claim 10, wherein the first ADC and the second ADC perform conversion operations alternately.

20. An interface, comprising:
    a first analog-digital converter (ADC) having a first control circuit; and
    a second ADC having a second control circuit,
       wherein a bit data of the first ADC is feedback to the second control circuit,
       wherein a bit data of the second ADC is feedback to the first control circuit, and
       wherein a conversion operation of the second ADC is delayed compared to a conversion operation of the first ADC.

* * * * *